United States Patent
Tsukahara et al.

(10) Patent No.: US 9,997,770 B2
(45) Date of Patent: Jun. 12, 2018

(54) LITHIUM-SULFUR SECONDARY BATTERY

(71) Applicant: ULVAC, INC., Kanagawa (JP)

(72) Inventors: Naoki Tsukahara, Kanagawa (JP); Yoshiaki Fukuda, Kanagawa (JP); Tatsuhiro Nozue, Kanagawa (JP); Hirohiko Murakami, Kanagawa (JP)

(73) Assignee: ULVAC, INC., Kanagawa (JP)

( * ) Notice: Subject to any disclaimer, the term of this patent is extended or adjusted under 35 U.S.C. 154(b) by 124 days.

(21) Appl. No.: 15/036,099

(22) PCT Filed: Oct. 15, 2014

(86) PCT No.: PCT/JP2014/005235
§ 371 (c)(1),
(2) Date: May 12, 2016

(87) PCT Pub. No.: WO2015/092958
PCT Pub. Date: Jun. 25, 2015

(65) Prior Publication Data
US 2016/0285075 A1    Sep. 29, 2016

(30) Foreign Application Priority Data
Dec. 20, 2013    (JP) ................. 2013-264313

(51) Int. Cl.
*H01M 4/133*    (2010.01)
*H01M 4/1393*    (2010.01)
(Continued)

(52) U.S. Cl.
CPC ......... *H01M 4/133* (2013.01); *H01M 4/0404* (2013.01); *H01M 4/0416* (2013.01);
(Continued)

(58) Field of Classification Search
None
See application file for complete search history.

(56) References Cited

U.S. PATENT DOCUMENTS

2009/0169464 A1*   7/2009   Chang ................. B01J 23/835
                                                          423/445 B
2011/0281156 A1    11/2011  Boren et al.
(Continued)

FOREIGN PATENT DOCUMENTS

JP        2011068501 A  *  4/2011
JP   WO 2012070184 A1  *  5/2012   .......... H01M 4/1393
(Continued)

OTHER PUBLICATIONS

International Search Report for PCT Patent App. No. PCT/JP2014/005235 (dated Jan. 13, 2015) with English translation.

*Primary Examiner* — Daniel S Gatewood
(74) *Attorney, Agent, or Firm* — Cermak Nakajima & McGowan LLP; Tomoko Nakajima

(57) ABSTRACT

Provided are a positive electrode for a lithium-sulfur secondary battery capable of surely covering with sulfur a portion of carbon nanotubes near a current collector and capable of supplying an electrolytic solution up to the vicinity of a base end of the carbon nanotubes efficiently even when sulfur expands in volume during discharge, and a method of forming the same. The positive electrode for a lithium-sulfur secondary battery includes: a current collector; a plurality of carbon nanotubes which are grown on a surface of the current collector such that the current collector-surface side serves as a base end and so as to be oriented in a direction perpendicular to the surface of the current collector; and sulfur to cover the surface of each of the carbon nanotubes at a density of the carbon nanotubes of 40 mg/cm$^3$ or less.

6 Claims, 5 Drawing Sheets

(51) Int. Cl.
*H01M 4/136* (2010.01)
*H01M 4/1397* (2010.01)
*H01M 4/04* (2006.01)
*H01M 4/66* (2006.01)
*H01M 4/38* (2006.01)
*H01M 4/36* (2006.01)
*H01M 4/58* (2010.01)
*H01M 4/62* (2006.01)
*H01M 10/052* (2010.01)
*H01M 4/02* (2006.01)

(52) U.S. Cl.
CPC ....... *H01M 4/0428* (2013.01); *H01M 4/0471* (2013.01); *H01M 4/136* (2013.01); *H01M 4/1393* (2013.01); *H01M 4/1397* (2013.01); *H01M 4/366* (2013.01); *H01M 4/38* (2013.01); *H01M 4/5815* (2013.01); *H01M 4/625* (2013.01); *H01M 4/661* (2013.01); *H01M 4/667* (2013.01); *H01M 10/052* (2013.01); *H01M 2004/028* (2013.01); *Y02T 10/7011* (2013.01)

(56) References Cited

U.S. PATENT DOCUMENTS

| | | |
|---|---|---|
| 2013/0202961 A1 | 8/2013 | Hagen et al. |
| 2013/0209880 A1* | 8/2013 | Nozue ................ H01M 4/1393 429/211 |
| 2014/0052322 A1 | 2/2014 | Takeshi |

FOREIGN PATENT DOCUMENTS

| | | |
|---|---|---|
| JP | 2012-238448 A | 12/2012 |
| JP | 2013-538413 A | 10/2013 |
| JP | 2014-203593 A | 10/2014 |
| WO | WO2011/146445 A2 | 11/2011 |
| WO | WO2012/070184 A1 | 5/2012 |

* cited by examiner

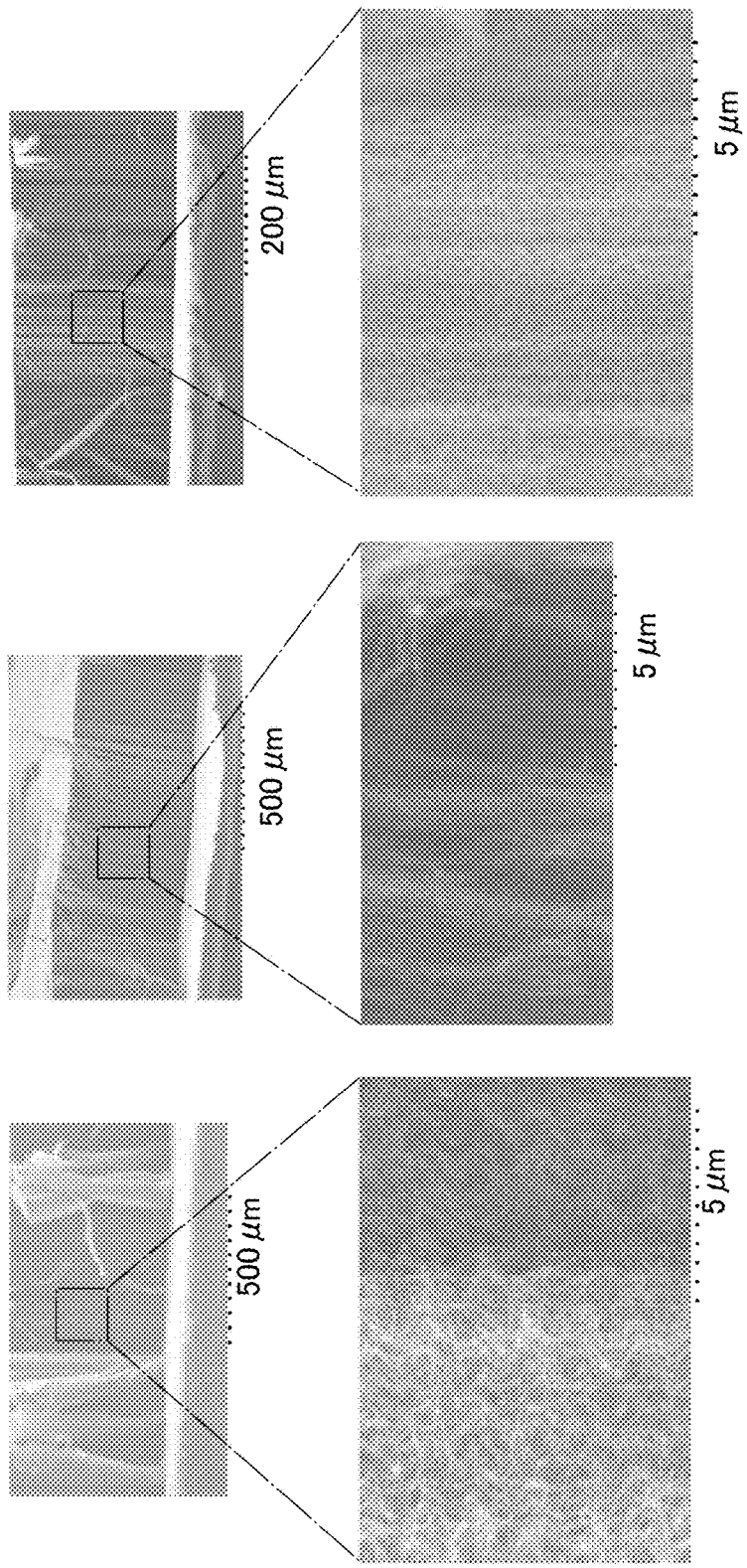

LITHIUM-SULFUR SECONDARY BATTERY

This application is a national phase entry under 35 U.S.C. § 371 of PCT Patent Application No. PCT/JP2014/005235, filed on Oct. 15, 2014, which claims priority under 35 U.S.C. § 119 to Japanese Patent Application No. 2013-264313, filed Dec. 20, 2013, both of which are incorporated by reference.

TECHNICAL FIELD

The present invention relates to a lithium-sulfur secondary battery.

BACKGROUND ART

Since a lithium secondary battery has a high energy density, an application range thereof is not limited to a handheld equipment such as a mobile phone or a personal computer, but is expanded to a hybrid automobile, an electric automobile, an electric power storage system, and the like. As one of these secondary batteries, attention has been recently paid to a lithium-sulfur secondary battery for charging and discharging through a reaction between lithium and sulfur.

There is known, in Patent Document 1, a lithium-sulfur secondary battery which is provided with a positive electrode including a positive electrode active material containing sulfur, a negative electrode including a negative electrode active material containing lithium, and a separator disposed between the positive electrode and the negative electrode.

As a positive electrode of this kind of lithium-sulfur secondary battery, there is known, e.g., in Patent Document 1 a positive electrode which includes a current collector, a plurality of carbon nanotubes which are grown so as to be oriented in a direction perpendicular to the surface of the current collector, and sulfur which covers the surface of each of the carbon nanotubes (in general, the density of a carbon nanotube is 60 mg/cm$^3$, and the weight of sulfur is 0.7 to 3 times the weight of a carbon nanotube). If this positive electrode is applied to a lithium-sulfur secondary battery, an electrolytic solution comes into contact with sulfur over a wide area, with an improved utilization efficiency of sulfur, whereby an excellent charge-discharge rate characteristic and a large specific capacity (discharge capacity per unit weight of sulfur) is obtained.

Here, as a method of covering the surface of each of the carbon nanotubes with sulfur, there is generally known a method in which sulfur is placed at a growing end of the carbon nanotubes, the sulfur is melted, and the melted sulfur is diffused into a base end side through a gap between the respectively adjacent carbon nanotubes. However, in this kind of method, sulfur is present unevenly only near the growing end of the carbon nanotubes, and is not diffused up to the vicinity of the base end of the carbon nanotubes. As a result, there are cases where the vicinity of the base end is not covered with sulfur or may be covered with sulfur having an extremely thin film thickness even when being covered with sulfur. In addition, during discharge, sulfur reacts with lithium to become $Li_2S$, and expands in volume by about 80%. Therefore, the gap between the respectively adjacent carbon nanotubes becomes smaller, and the electrolytic solution is not supplied up to the vicinity of the base end of the carbon nanotubes efficiently. This does not bring about a lithium-sulfur secondary battery having an excellent charge-discharge rate characteristic and a large specific capacity.

Therefore, the inventors of this invention made intensive studies and have come to obtain the following finding. That is, if the density of the carbon nanotubes can be set to a value of 40 mg/cm$^3$ or lower, even in a method that is similar to above, sulfur can be efficiently supplied down to the interface between the current collector and the base end of the carbon nanotubes when sulfur is melted and diffused. In addition, even when sulfur expands in volume during discharge, the electrolytic solution can be supplied down to the vicinity of the base end of the carbon nanotubes efficiently.

LIST OF PRIOR ART DOCUMENTS

Patent Documents

Patent Document 1: WO 2012/070184 A

SUMMARY

Problems to be Solved by the Invention

In view of the above points, it is a problem of the invention to provide a positive electrode for a lithium-sulfur secondary battery capable of surely covering the carbon nanotubes to the neighborhood of a current collector with sulfur and capable of supplying an electrolytic solution down to the vicinity of a base end of the carbon nanotubes efficiently even when sulfur expands in volume during discharge, as well as to provide a method of forming the same.

Means to Solve the Problem

In order to solve the above problems, in a positive electrode for a lithium-sulfur secondary battery comprising: a current collector; a plurality of carbon nanotubes which are grown on a surface of the current collector such that the current collector-surface side serves as a base end and so as to be oriented in a direction perpendicular to the surface of the current collector; characterized in that a density of the carbon nanotubes is 40 mg/cm$^3$ or less. The lower limit of the density of each of the carbon nanotubes is set within a range in which a predetermined specific capacity can be obtained.

According to the invention, by setting the density of the carbon nanotubes to 40 mg/cm$^3$ or less, sulfur can be diffused down to the base end side through a gap between the respectively adjacent carbon nanotubes, and the carbon nanotubes can be surely covered with sulfur down to the vicinity of the current collector. In addition, even when sulfur expands in volume during electric discharging, since a gap is surely secured between the respectively adjacent carbon nanotubes, an electrolytic solution can be efficiently supplied down to the vicinity of the current collector. Therefore, sulfur comes into contact with the electrolytic solution over a wide area. As a result, an utilization efficiency of sulfur is further enhanced, and a particularly high rate characteristic and a further increased specific capacity can be obtained in cooperation with sufficient donation of electrons to sulfur.

Here, when the carbon nanotubes are covered with sulfur down to the vicinity of the current collector, that is, when the amount of sulfur impregnated in the positive electrode is large, the amount of a polysulfide generated by a reaction between sulfur and lithium during discharge is increased. A polysulfide is dissolved into an electrolytic solution easily. By arrival of the polysulfide at the negative electrode through the electrolytic solution, a discharge reaction is not accelerated (redox-shuttle phenomenon).

Therefore, in the invention, suppose that the length of each of the carbon nanotubes grown linearly from the base end to a growing end is defined to be an apparent length, then each of the carbon nanotubes has at least one bent portion or curved portion between the base end and the growing end. Preferably, a grown height of each of the carbon nanotubes from the base end to the growing end is within 0.4 to 0.8 times the apparent length. According to this arrangement, the surface area of the carbon nanotubes can be made larger than that of related art. A polysulfide is effectively adsorbed into the surfaces of the carbon nanotubes. Elution of the polysulfide into the electrolytic solution and, consequently, arrival of the polysulfide at a negative electrode can be suppressed.

A method of forming a positive electrode for a lithium-sulfur secondary battery according to the invention comprises: method of forming a positive electrode for a lithium-sulfur secondary battery, comprising: a forming step of forming a catalyst layer on a surface of a substrate to grow a plurality of carbon nanotubes on a surface of the catalyst layer so as to be oriented in a direction perpendicular to the surface of the catalyst layer from a base end which is on a surface side of the catalyst layer; and a coating step of melting and diffusing sulfur from the growing end side of the carbon nanotubes to cover a surface of each of the carbon nanotubes with sulfur, wherein the forming step comprises disposing the substrate having formed thereon the catalyst layer, and introducing a raw material gas containing a hydrocarbon gas and a dilution gas into the heating furnace in order to grow the carbon nanotubes with a thermal CVD method. According to this invention, this makes it possible to surely obtain a positive electrode for a lithium-sulfur secondary battery in which the grown height of each carbon nanotube from the base end to the growing end is 0.4 to 0.8 times the apparent length.

BRIEF DESCRIPTION OF THE DRAWINGS

FIGS. 4(a) to 4(c) are cross-sectional SEM photographs of invention products 1 and 2 and a comparative product which are carbon nanotubes manufactured in order to show an effect of the invention.

EMBODIMENT FOR CARRYING OUT THE INVENTION

Figure 1:
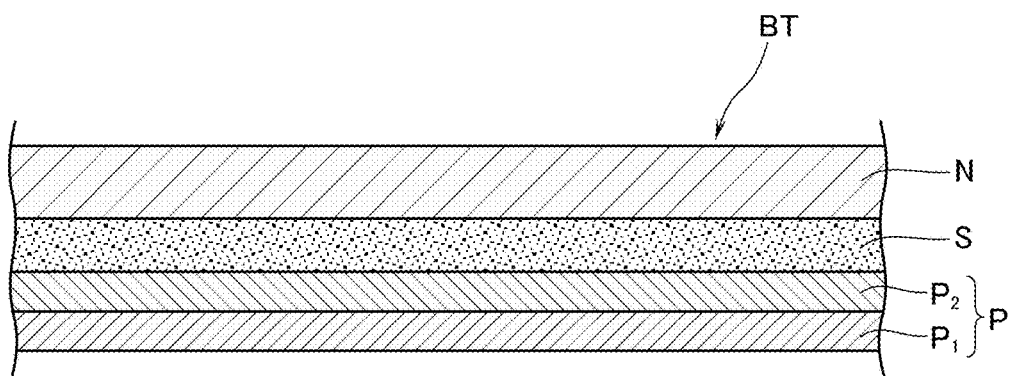
FIG. 1 is a schematic cross sectional view illustrating a structure of a lithium-sulfur secondary battery according to an embodiment of the invention.

Hereinafter, a positive electrode for a lithium-sulfur secondary battery and a method of forming the same according an embodiment of the invention will be described with reference to the drawings. With reference to FIG. 1, a lithium-sulfur secondary battery BT comprises a positive electrode P having a positive electrode active material containing sulfur, a negative electrode N having a negative electrode active material containing lithium, a separator S disposed between the positive electrode P and the negative electrode N, and an electrolytic solution (not illustrated) held by the separator S and having a conductivity of a lithium ion ($Li^+$) between the positive electrode P and the negative electrode N.

Examples of the negative electrode N include Li, an alloy of Li and Al, In, or the like, and Si, SiO, Sn, $SnO_2$, or hard carbon doped with lithium ions. Examples of the separator S include a porous film and a nonwoven fabric made of a resin such as polyethylene or polypropylene. An electrolytic solution L contains an electrolyte and a solvent for dissolving the electrolyte. Examples of the electrolyte include well-known lithium bis(trifluoromethanesulfonyOimide (hereinafter, referred to as "LiTFSI"), $LiPF_6$, and $LiBF_4$. As the solvent, a well-known solvent can be used, and for example, at least one selected from ethers such as tetrahydrofuran, diglyme, triglyme, tetraglyme, diethoxyethane (DEE), and dimethoxyethane (DME), and esters such as diethyl carbonate and propylene carbonate can be used. In order to stabilize a discharge curve, it is preferable to mix dioxolane (DOL) to the at least one selected. For example, when a mixed liquid of diethoxy ethane and dioxolane is used as a solvent, the mixing ratio between diethoxyethane and dioxolane can be set to 9:1. Since well-known elements can be used as the other constituent elements other than the positive electrode P, detailed description thereof is omitted here.

Figure 2:
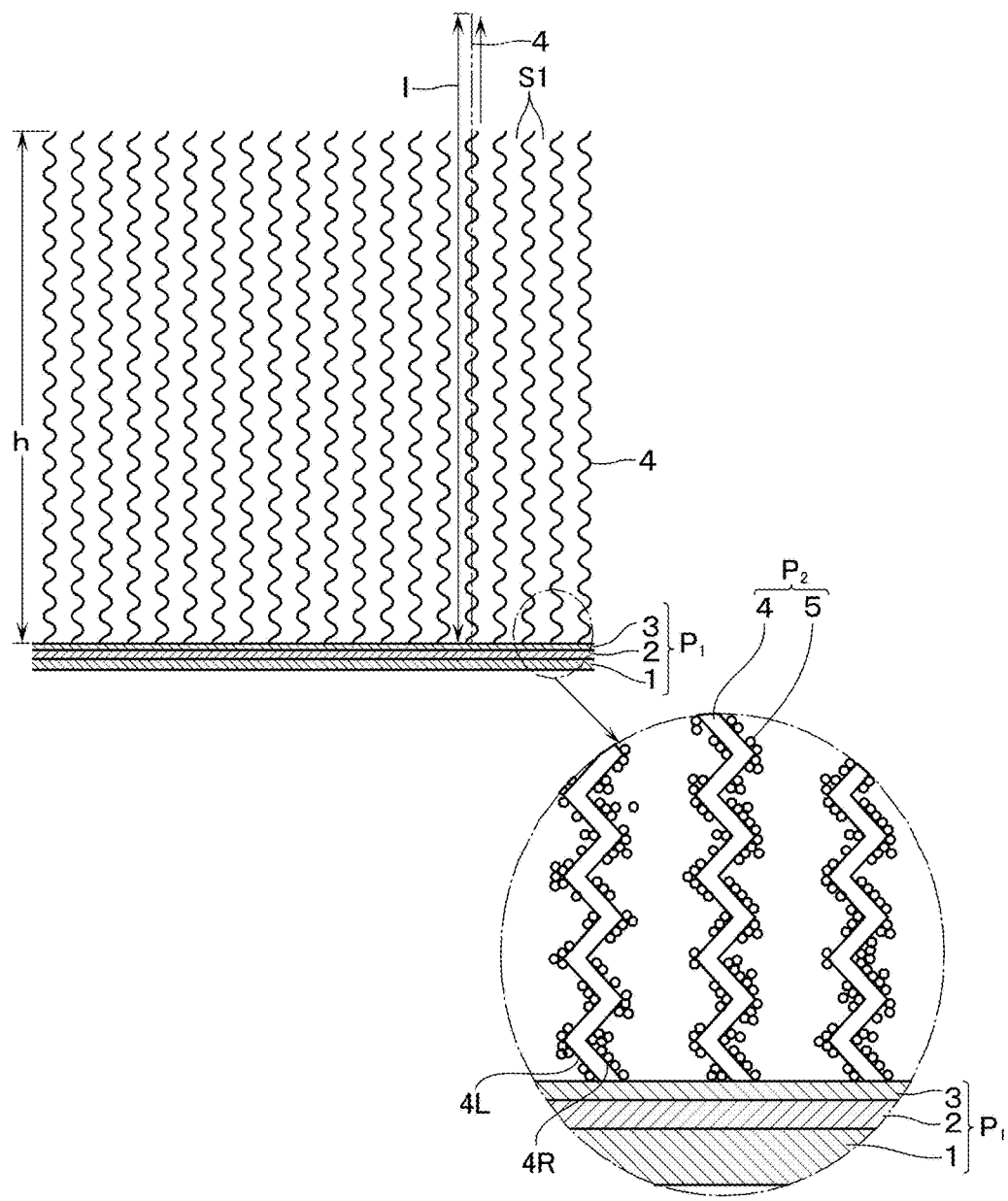
FIG. 2 is an enlarged schematic cross sectional view illustrating a positive electrode in FIG. 1.

With reference to FIG. 2, the positive electrode P includes a positive electrode current collector P1 and a positive electrode active material layer P2 formed on a surface of the positive electrode current collector P1. The positive electrode current collector P1 includes, for example, a substrate 1, an underlying film (also referred to as "a barrier film") 2 formed on a surface of the substrate 1 to the film thickness of 5 to 80 nm, and a catalyst layer 3 formed on the underlying film 2 to the film thickness of 0.5 to 5 nm. A metal foil or a metal mesh made of Ni, Cu, or Pt, for example, can be used as the substrate 1. The underlying film 2 is used for improving adhesion between the substrate 1 and carbon nanotubes 4 described below. For example, the underlying film 2 is formed of at least one metal selected from Al, Ti, V, Ta, Mo, and W, or a nitride thereof. For example, the catalyst layer 3 is formed of at least one metal selected from Ni, Fe, and Co.

The positive electrode active material layer P2 includes the plurality of carbon nanotubes 4 grown on a surface of the positive electrode current collector P1 so as to be oriented in a direction perpendicular to the surface, and sulfur 5 covering the entire surface of each of the carbon nanotubes 4. There is a gap S1 between the respectively adjacent carbon nanotubes 4, and an electrolytic solution (electrolyte) is arranged to flow into each of these gaps S1. As a method of growing the carbon nanotubes 4 (growth step), a thermal CVD method using a heating furnace is used, as described below. On the other hand, as a method of covering a surface of each of the carbon nanotubes 4 with the sulfur 5 (coverage step), there is employed one in which: granular sulfur is sprayed to the growing end of the carbon nanotubes 4; the sulfur 5 is heated to the melting point of the sulfur 5 (113° C.) or higher for melting it; and the melted sulfur 5 is diffused down to the base end side through the gap S1 between the respectively adjacent carbon nanotubes 4.

By the way, when the gap S1 between the respectively adjacent carbon nanotubes 4 is small, there is a case where the melted sulfur 5 cannot surely be diffused down to the base end side through the gap S1. In addition, during discharge, since the sulfur 5 reacts with lithium and expands in volume, the gap is smaller than the one at the time of charge, and an electrolytic solution flows into the gap more hardly.

Therefore, in this embodiment, the density (weight per unit volume) of the carbon nanotubes 4 was set to 40 mg/cm$^3$ or less. The lower limit of the density is set within a range capable of obtaining a predetermined specific capacity. According to this arrangement, a gap is surely secured between the respectively adjacent carbon nanotubes 4. Therefore, melted sulfur is diffused down to the base end side of the carbon nanotubes, and the carbon nanotubes can be covered with the sulfur down to the base end side. In addition, even when the sulfur 5 expands in volume during discharge, an electrolytic solution can flow into the carbon nanotubes down to the base end side. As a result, sulfur comes into contact with the electrolytic solution in a wide area. An utilization efficiency of sulfur is further enhanced, and a particularly high rate characteristic and a further increased specific capacity can be obtained in cooperation with sufficient donation of electrons to sulfur.

Figure 3A:
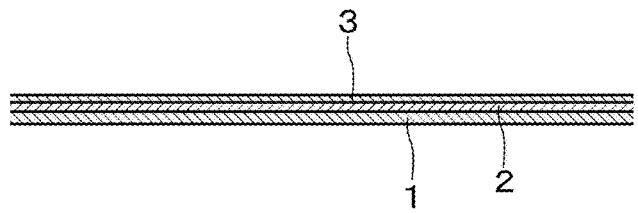
FIGS. 3(a) to 3(c) are diagrams for describing procedures for forming the positive electrode for a lithium-sulfur secondary battery according to the embodiment of the invention.
Figure 3B:
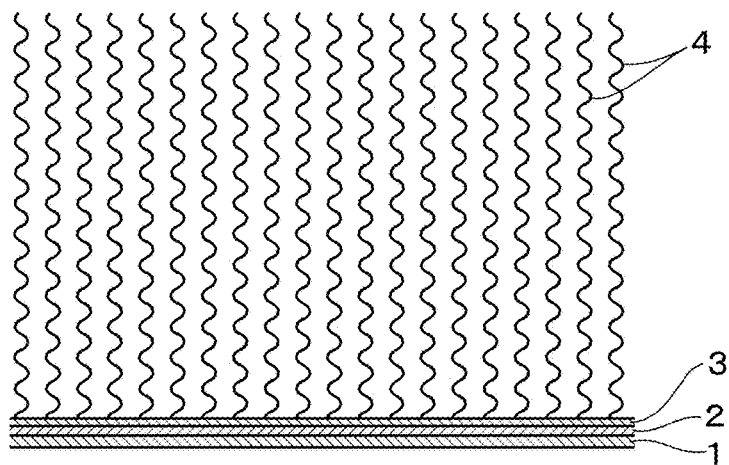
Figure 3C:
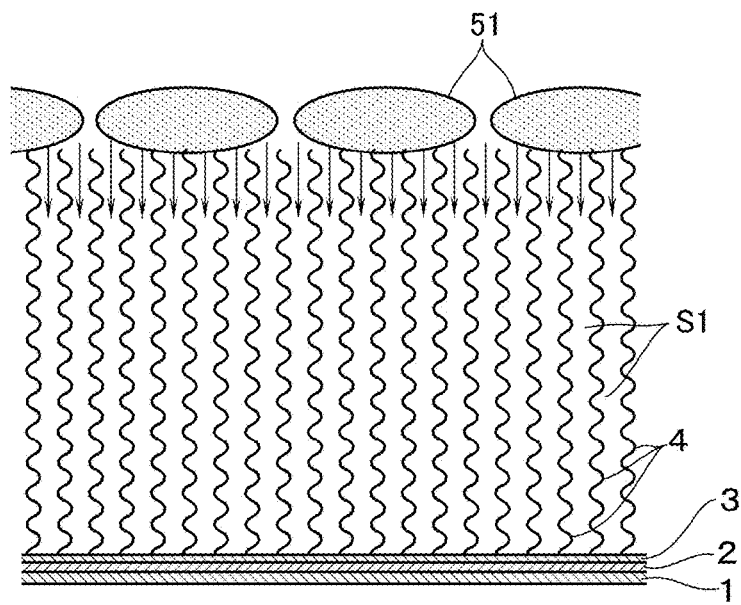

Here, when the carbon nanotubes 4 are covered with the sulfur 5 up to the vicinity of the current collector, the amount of sulfur impregnated in the positive electrode P becomes large. The amount of a polysulfide generated by a reaction between the sulfur 5 and lithium during discharge is increased, and a redox-shuttle phenomenon comes to occur easily. As a solution, as illustrated in FIG. 2, let us define the length of the carbon nanotubes 4 when linearly grown from a base end to a growing end as an apparent length l. The carbon nanotubes 4 were then grown such that each of the carbon nanotubes 4 had at least one bent portion or curved portion between the base end and the growing end and that the grown height h of each of the carbon nanotubes 4 between the base end and the growing end falls within a range of 0.4 to 0.8 times the apparent length l. This makes the surface area of the carbon nanotubes 4 larger than that of the conventional art (the increase is, for example, 1.3 to 2.4 times). Therefore, a polysulfide is adsorbed by the surfaces of the carbon nanotubes 4 effectively. Elution of the polysulfide into the electrolytic solution L and, consequently, arrival of the polysulfide at the negative electrode N can be suppressed. When the grown height h is smaller than 0.4 times, there is a problem in that the conductivity is not sufficiently imparted to sulfur disadvantageously when a large amount of sulfur is impregnated. On the other hand, when the grown height h is larger than 0.8 times, there is a problem in that the increase in the surface area becomes insufficient. Hereinafter, a method of forming a positive electrode for a lithium-sulfur secondary battery according to this embodiment will be described with reference to FIG. 3.

The underlying film 2 is formed on a surface of the substrate 1, and the catalyst layer 3 is formed on a surface of the underlying film 2, thereby manufacturing the positive electrode current collector P1. As the method of forming the underlying film 2 and the catalyst layer 3, there can be used, for example, a known electron beam vapor deposition method, sputtering method, or clipping method using a solution of a compound containing a catalyst metal. Therefore, detailed description is omitted here.

Subsequently, as the growth step, the current collector P1 is disposed in a known heating furnace (not illustrated), and a raw material gas containing a hydrocarbon gas and a dilution gas is introduced into the heating furnace. Examples of the hydrocarbon gas include methane, ethylene, and acetylene. Examples of the dilution gas include nitrogen, argon, and hydrogen. The flow rates of the hydrocarbon gas and the dilution gas can be set appropriately depending on the capacity of a processing chamber. For example, the flow rate of the hydrocarbon gas can be set within a range of 10 to 500 sccm, and the flow rate of the dilution gas can be set within a range of 100 to 5000 sccm (at this time, a differential pressure is set to 100 Pa to an atmospheric pressure, for example). Then, the current collector P1 and the raw material gas in the heating furnace are heated to a temperature of 600 to 800° C. As described above, each of the carbon nanotubes 4 thereby has at least one bent portion or curved portion in a portion between the base end and the growing end, and the grown height h of each of the carbon nanotubes 4 from the base end to the growing end is 0.4 to 0.8 times the apparent length l. At this time, the density of the carbon nanotubes is 40 mg/cm$^3$ or less. In the invention, it is assumed that the carbon nanotubes 4 having at least one bent portion or curved portion include the carbon nanotubes 4 grown helicoidally. Here, a mechanism by which the carbon nanotubes 4 are bent or curved is not necessarily clear. However, the mechanism is considered to be as follows with reference to the enlarged view in FIG. 2. That is, the carbon nanotubes 4 are grown with a component in a left-right direction because the growing rate of the carbon nanotubes 4 on the left part 4L is larger than that on the right part 4R due to the catalyst layer 3. The carbon nanotubes 4 are bent or curved in a direction with a large space (free space) because of presence of the adjacent one of the carbon nanotube 4. As a heating furnace capable of generating a partial difference in the growing rate of the carbon nanotubes 4, it is possible to use an electric furnace (also referred to as "muffle furnace" or "atmosphere furnace") for heating an inner space of a chamber by energizing a heater provided inside or outside the chamber, or an image furnace for mainly heating a heating object (current collector P1) by condensing lamp light such as an infrared lamp.

Subsequently, as the coverage step, granular sulfur 51 having a particle diameter of 1 to 100 μm is sprayed from above over the entire area where the carbon nanotubes 4 have been grown. The weight of the sulfur 51 is only necessary to be set to a value 0.2 to 20 times that of the carbon nanotubes 4. When the weight of the sulfur is less than 0.2 times, the surface of each of the carbon nanotubes 4 fails to be evenly covered with sulfur any longer. When the weight of the sulfur is more than 20 times, the sulfur 5 if filled up even into the gap S1 between the respectively adjacent carbon nanotubes 4. Then, the positive electrode current collector P1 is disposed in a tubular furnace (not illustrated) and is heated to a temperature of 120 to 250° C. not less than the melting point of sulfur (113° C.), and the sulfur 51 is caused to be melted. When sulfur is heated in the air, the melted sulfur reacts with water in the air to generate sulfur dioxide. Therefore, it is preferable to heat sulfur in an inert gas atmosphere such as Ar or He, or in vacuo.

Here in the embodiment, the density of each of the carbon nanotubes 4 is set to 40 mg/cm$^3$ or less. Therefore, the melted sulfur 51 flows into a gap between the respectively adjacent carbon nanotubes 4 and is surely diffused down to the base end of the carbon nanotubes 4. As a result, the surface of each of the carbon nanotubes 4 is covered with the sulfur 5 while leaving the gap S1 between the respectively adjacent carbon nanotubes 4 (see FIG. 2).

Next, the following experiment was performed in order to confirm the effect of the invention. In this experiment, first, the positive electrode P was manufactured as follows. A Ni foil having a diameter of 14 mmφ) and a thickness of 0.020 mm was used as the substrate 1. An Al film having a thickness of 50 nm as the underlying film 2 was formed on the Ni foil 1 by an electron beam evaporation method, and an Fe film having a thickness of 2 nm as the catalyst layer 3 was formed on the Al film 2 by an electron beam evaporation method to manufacture the positive electrode current collector P1. Subsequently, the positive electrode current collector P1 was disposed in a heating furnace. Then, while acetylene at 100 sccm and nitrogen at 5000 sccm were supplied into the heating furnace, the carbon nanotubes 4 were grown on the surface of the positive electrode current collector P1 so that carbon nanotubes 4 were grown to be oriented perpendicularly at an operation pressure of 1 atmospheric pressure, at a heating temperature of 750° C., and at a growing time of 60 minutes. At this time, the density of the carbon nanotubes 4 was 16.5 mg/cm$^3$. The granular sulfur 51 was placed on the carbon nanotubes 4, what was thus obtained was disposed in a heating furnace to cover the carbon nanotubes 4 with sulfur 5 by heating it at 250° C. for five minutes in an Ar atmosphere, thereby covering the carbon nanotubes 4 with sulfur 5. The positive electrode P was thereby manufactured. In the positive electrode P, the weight ratio per unit area between the sulfur 5 and the carbon nanotubes 4 was 7.17 (10.27 (mg/cm$^2$)/1.43 (mg/cm$^2$)). As the separator S, a porous film made of polypropylene was used. As the negative electrode N, an electrode having a diameter of 15 mmφ and a thickness of 0.6 mm and made of metal lithium was used. The positive electrode P and the negative electrode N were disposed so as to face each other through the separator S, and the separator S was made to hold the electrolytic solution L. A coin cell of a lithium-sulfur secondary battery was thereby manufactured. Here, as the electrolytic solution L, a solution obtained by dissolving LiTFSI as an electrolyte in a mixed liquid (mixing ratio 9:1) of diethoxy ethane (DEE) and dioxolane (DOL) and adjusting the concentration to 2 mol/l was used. The coin cell manufactured in this way was referred to as invention product 1. A coin cell manufactured in a manner similar to the above invention product 1 except that the carbon nanotubes were grown at a density of 25.3 mg/cm$^3$, was referred to as invention product 2. A coin cell manufactured in a manner similar to the above invention product 1 except that the carbon nanotubes were grown at a density of 43.4 mg/cm$^3$, was referred to as a comparative product. SEM photographs of positive electrodes of invention products 1 and 2 and the comparative product are illustrated in FIGS. 4(a) to 4(c), respectively. According to these photographs, the following has been confirmed. That is, in invention products 1 and 2 having a density of the carbon nanotubes of 40 mg/cm$^3$ or less, the carbon nanotubes are covered with sulfur up to the base end side. On the other hand, in the comparative product having a density of more than 40 mg/cm$^3$, the carbon nanotubes are not covered with sulfur up to the base end side. In addition, the following has been confirmed. That is, in invention product 1, the grown height h of each of the carbon nanotubes 4 from the base end to the growing end is 0.6 times the apparent length l. In the invention product 2, the grown height is 0.9 times, and in the comparative product, the grown height is 0.9 times.

Figure 5:
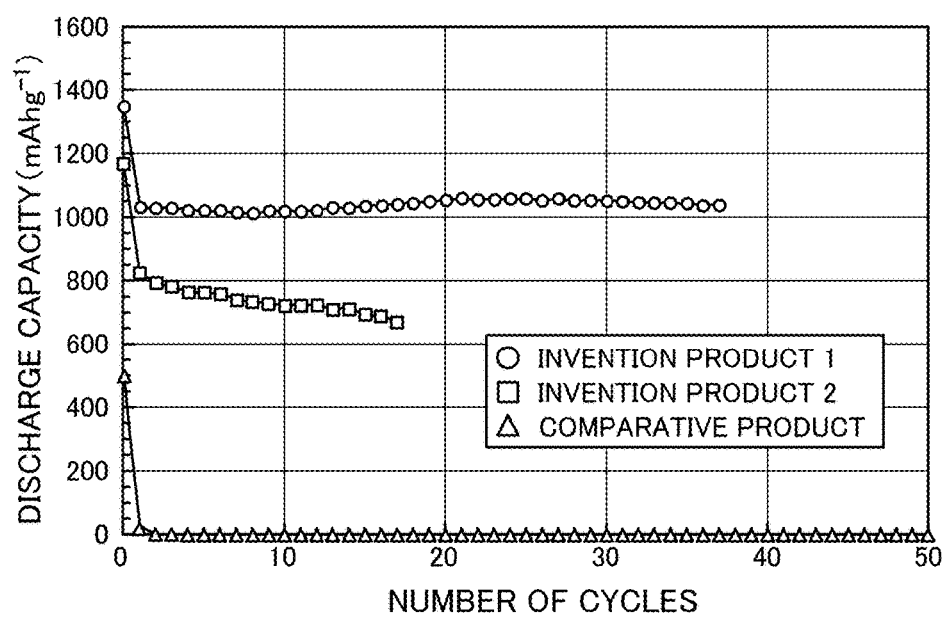
FIG. 5 is a graph indicating an experimental result (cycle characteristic of discharge capacity) for confirming the effect of the invention.

Charge and discharge were performed for each of invention products 1 and 2 and the comparative product. FIG. 5 illustrates cycle characteristics of discharge capacities thereof. According to these cycle characteristics, it has been confirmed that invention product 1 has a discharge capacity of 1000 mAh/g even at the 37th time and can obtain a higher cycle characteristic than invention product 2 or the comparative product. This is considered to be because of the following. That is, in invention product 1, the grown height h of each of the carbon nanotubes 4 is 0.6 times the apparent length l, and the surface area of the carbon nanotubes 4 is larger than that of invention product 2 or the comparative product in which the grown height is 0.9 times. Therefore, elution of a polysulfide into an electrolytic solution can be suppressed, and a redox-shuttle phenomenon can be suppressed.

Hereinabove, the embodiment of the invention has been described. However, the invention is not limited to those described above. The shape of the lithium-sulfur secondary battery is not particularly limited, and may be a button type, a sheet type, a laminate type, a cylinder type, or the like in addition to the above coin cell.

EXPLANATION OF REFERENCE MARKS

B lithium-sulfur secondary battery
P positive electrode
N negative electrode
L electrolytic solution
P1 current collector
1 substrate
4 carbon nanotube
h grown height of carbon nanotube
l apparent length of carbon nanotube
5 sulfur

The invention claimed is:
1. A positive electrode for a lithium-sulfur secondary battery comprising:
   a current collector;
   a plurality of carbon nanotubes
   which is formed on a surface of the current collector such that the current collector-surface side serves as a base end and
   which is configured to be oriented in a direction perpendicular to the surface of the current collector;
   characterized in that wherein a density of the carbon nanotubes is 40 mg/cm$^3$ or less.
2. The positive electrode for a lithium-sulfur secondary battery according to claim 1,
   wherein a height of each of the carbon nanotubes from the base end to the growing end is within 0.6 to 0.9 times length of each of the carbon nanotubes the height defined to be the distance from the base end to the growing end when it is bent or curved, and
   the length defined to be the length of each nanotubes from the base end to a growing when it is imaginarily straightened.
3. A method of forming a positive electrode for a lithium-sulfur secondary battery, comprising:
   a forming step of forming a catalyst layer on a surface of a substrate to form a plurality of carbon nanotubes which are formed on a surface of the catalyst layer such that the catalyst layer-surface side serves as a base end and so as to be oriented in a direction perpendicular to the surface of the catalyst layer;
   a setting step of setting a density of the carbon nanotubes to be 40 mg/cm$^3$; and
   a coating step of melting and diffusing sulfur from the growing end side of the carbon nanotubes to cover a surface of each of the carbon nanotubes with sulfur,
   wherein the forming step comprises disposing into a heating furnace the substrate having formed thereon the catalyst layer, and introducing a raw material gas containing a hydrocarbon gas and a dilution gas into the heating furnace in order to grow the carbon nanotubes with a thermal CVD method.

4. The positive electrode for a lithium-sulfur secondary battery according to claim 1,
   wherein, the carbon nanotube includes carbon nanotubes grown helicoidally.

5. The method of forming a positive electrode for a lithium-sulfur secondary battery according to claim 3,
   wherein in the forming step, the growing rate of one side part of the carbon nanotubes is larger than the growing rate of the other side part of the carbon nanotubes so that the carbon nanotubes are bent or curved.

6. The method of forming a positive electrode for a lithium-sulfur secondary battery according to claim 3,
   wherein the heating furnace is a muffle furnace or an atmosphere furnace which heats an inner space of the heating furnace.

* * * * *